(12) United States Patent
Matsushita

(10) Patent No.: US 8,290,261 B2
(45) Date of Patent: Oct. 16, 2012

(54) IMAGE PROCESSING APPARATUS AND IMAGE PROCESSING METHOD

(75) Inventor: Akihiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 12/414,286

(22) Filed: Mar. 30, 2009

(65) Prior Publication Data

US 2009/0252412 A1    Oct. 8, 2009

(30) Foreign Application Priority Data

Apr. 4, 2008    (JP) .................. 2008-098745

(51) Int. Cl.
*G06K 9/00* (2006.01)

(52) U.S. Cl. ............... 382/167; 382/168; 382/274

(58) Field of Classification Search ............ 382/167, 382/168, 172, 274
See application file for complete search history.

(56) References Cited

U.S. PATENT DOCUMENTS

| | | | |
|---|---|---|---|
| 5,241,386 A | | 8/1993 | Tsuji et al. |
| 7,289,154 B2* | | 10/2007 | Gindele ............ 348/364 |
| 7,463,296 B2* | | 12/2008 | Sun et al. ............ 348/254 |
| 7,760,961 B2* | | 7/2010 | Moldvai ............ 382/274 |
| 2007/0286480 A1 | | 12/2007 | Mizuno et al. |

FOREIGN PATENT DOCUMENTS

| | | |
|---|---|---|
| JP | 2004-032207 A | 1/2004 |
| JP | 2005-285071 A | 10/2005 |
| JP | 2006-270417 | 10/2006 |
| JP | 2007-292804 A | 11/2007 |

* cited by examiner

*Primary Examiner* — Phuoc Tran
(74) *Attorney, Agent, or Firm* — Fitzpatrick, Cella, Harper & Scinto

(57) ABSTRACT

When the range of luminance values expressed by an image is divided into a plurality of levels, a histogram measurement unit generates histogram data indicating the numbers of pixels for respective levels by calculating, for respective levels, the total of the number of pixels in the image, which have luminance values belonging to an identical level. A microcomputer calculates, for respective levels, the difference between the number of pixels belonging to an identical level using the histogram data of a first frame image and that of a second frame image input immediately before the first frame image. The microcomputer determines based on the differences for the respective levels whether or not to update a tone correction table held by a tone correction unit, and then converts the tone characteristic of the first frame image using the tone correction table, and outputs the converted image.

8 Claims, 7 Drawing Sheets

IMAGE PROCESSING APPARATUS AND IMAGE PROCESSING METHOD

BACKGROUND OF THE INVENTION

1. Field of the Invention

The present invention relates to a technique for correcting the tone characteristic of an image.

2. Description of the Related Art

In recent years, digitization and resolution enhancement of videos have advanced. For example, it is demanded to display videos with higher quality even on televisions and displays for personal computers. For this reason, in a display, various kinds of image processing operations required to display an input video to have higher quality are executed.

As one technique for displaying a video to have higher quality, a technique called a dynamic gamma technique, which dynamically executes tone correction of a video, is known. In dynamic tone correction processing, processing for extracting an arbitrary feature amount from an input video, and generating a tone correction function based on the extracted feature amount is executed.

For example, a method of extracting a luminance histogram as a feature amount of an input video, and generating a function of converting a tone correction characteristic so as to average the values of the histogram in the luminance direction, or a table used to convert the tone correction characteristic is generally known.

However, if extreme correction is applied upon execution of dynamic tone correction, an unnatural video is often obtained. When a correction value is largely changed within a short period of time, the frame appears to flicker, or the brightness of a still part, such as a background in the frame, varies along with an elapse of time, resulting in an unnatural video. In order to solve these problems, various inventions are disclosed.

For example, in the invention disclosed in patent reference 1, the degree of scene changes is calculated based on a feature amount extracted from a video, and the response speed of tone correction is changed accordingly, thus improving display quality.

[Patent Reference 1] Japanese Patent Laid-Open No. 2006-270417

Another problem is posed upon execution of the dynamic tone correction processing. For example, assume that a tone correction curve is changed when only a part of a video moves or changes or in a scene in which the overall frame slowly moves by, e.g., a panning operation for moving a camera to capture an image. In this case, the brightness appears to change even for a non-moving part in a video or a panned video part, resulting in an unnatural video.

As one of visual effects, a scene called "fade-in" is known. For example, in a certain scene, the entire frame is displayed to have a black level in an initial scene, the luminance increases in steps along with an elapse of time, and an image gradually appears. In this case, since the conventional tone correction curve change method executes processing for increasing the luminance for a low-luminance image, it adversely affects an original fade-in effect.

The same applies to a fade-out effect. As an example of a fade-out scene, a normal image is displayed in an initial scene, the minimum level of the luminance of an image increases in steps along with an elapse of time, and the entire frame is finally displayed in white. In this case as well, since the conventional tone correction curve change method executes processing for lowering the luminance in case of an image with a high minimum luminance level, it adversely affects an original fade-out effect.

SUMMARY OF THE INVENTION

The present invention has been made in consideration of the aforementioned problems, and has as its object to provide a technique for implementing dynamic tone correction processing according to a change in video between frames.

According to the first aspect of the present invention, an image processing apparatus, which converts tone characteristics of input images input for respective frames using a tone correction table, and sequentially outputs the converted images as output images, comprises: a holding unit which holds the tone correction table; a generation unit which generates, when a range of luminance values that can be expressed by the input image is divided into a plurality of levels, histogram data indicating the numbers of pixels for respective levels by calculating, for respective levels, the total of the number of pixels in the input image, which have luminance values that belong to an identical level; a calculation unit which calculates, for respective levels, a difference between the numbers of pixels that belong to an identical level using histogram data generated by the generation unit for an input image of a first frame and histogram data generated by the generation unit for an input image of a second frame which was input immediately before the input image of the first frame; a determination unit which determines, based on the differences for respective levels calculated by the calculation unit, whether or not to update the tone correction table held by the holding unit; an updating unit which updates, when the determination unit determines to update the tone correction table, the tone correction table held by the holding unit; and a unit which outputs a result obtained by converting a tone characteristic of the input image of the first frame using the tone correction table held by the holding unit as an output image of the first frame.

According to the second aspect of the present invention, an image processing method is provided that is to be executed by an image processing apparatus, which comprises a holding unit which holds a tone correction table, converts tone characteristics of input images input for respective frames using the tone correction table, and sequentially outputs the converted images as output images. The method comprises: a generation step of generating, when a range of luminance values that can be expressed by the input image is divided into a plurality of levels, histogram data indicating the numbers of pixels for respective levels by calculating, for respective levels, the total of the number of pixels in the input image, which have luminance values that belong to an identical level; a calculation step of calculating, for respective levels, a difference between the numbers of pixels that belong to an identical level using histogram data generated in the generation step for an input image of a first frame and histogram data generated in the generation step for an input image of a second frame which was input immediately before the input image of the first frame; a determination step of determining, based on the differences for respective levels calculated in the calculation step, whether or not to update the tone correction table held by the holding unit; an updating step of updating, when it is determined in the determination step to update the tone correction table, the tone correction table held by the holding unit; and a step of outputting a result obtained by converting a tone characteristic of the input image of the first frame using the tone correction table held by the holding unit as an output image of the first frame.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of the preferred arrangement of the invention described in the scope of the claims, and the invention is not limited to the embodiments to be described hereinafter.

First Embodiment

Figure 1:
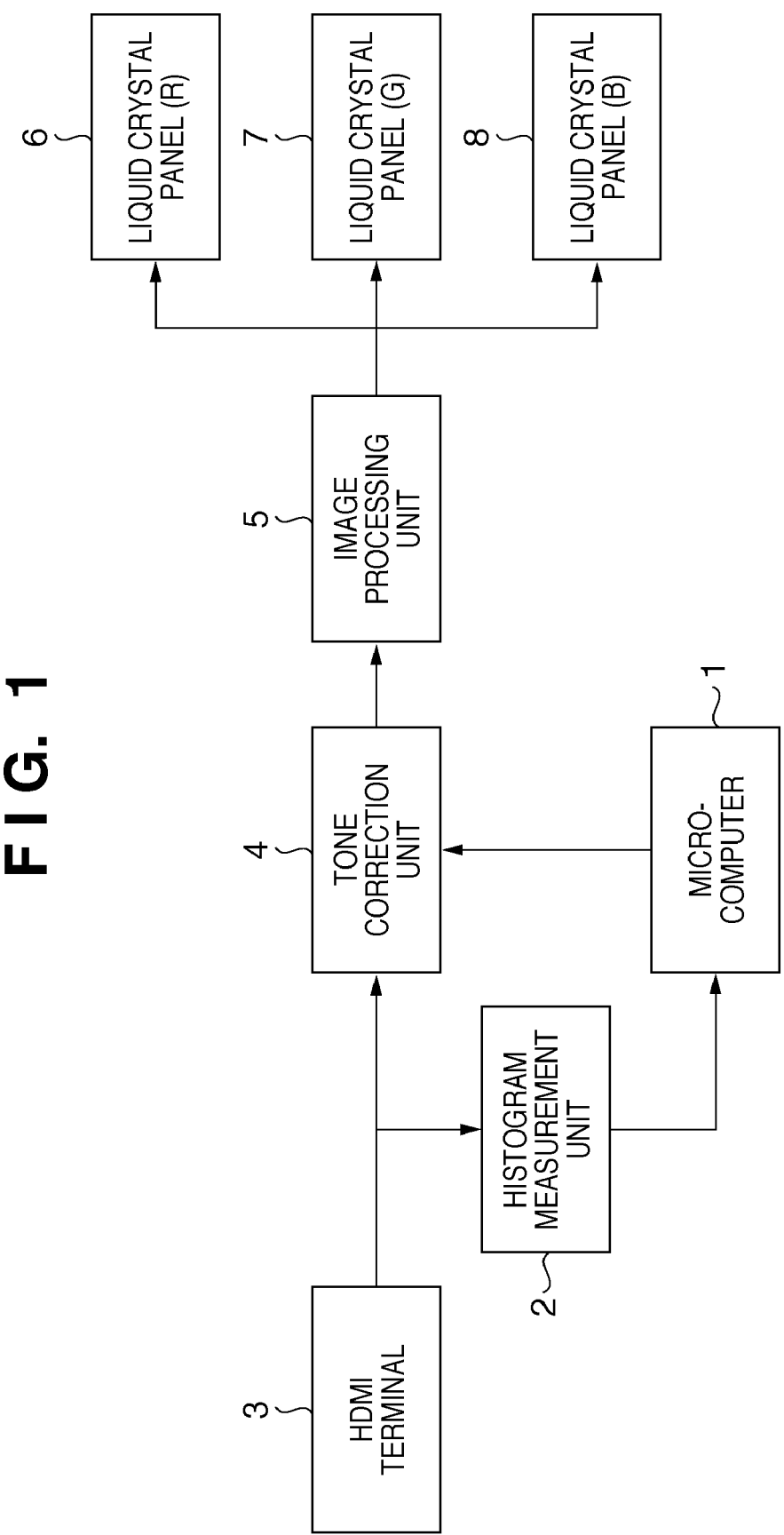
FIG. 1 is a block diagram showing a part of a signal processing circuit in a projection display to which an image processing apparatus according to the first embodiment of the present invention is applied.

This embodiment will explain an image processing apparatus which is applied to a signal processing circuit in a projection display. FIG. 1 is a block diagram showing a part of a signal processing circuit in a projection display to which an image processing apparatus according to this embodiment is applied.

In a projection display, an optical system including a light source lamp, an illumination optical system, light bulbs, and a projection optical system are formed. Light emitted by the light source lamp is separated into R, G, and B by the illumination optical system, and a liquid crystal panel (R) 6, liquid crystal panel (G) 7, and liquid crystal panel (B) 8 as the light bulbs are irradiated with these separated light components to modulate them. The modulated light components are projected in an enlarged size onto a screen arranged in front of the projection display by the projection optical system, so as to be displayed as an image.

As shown in FIG. 1, the image processing apparatus according to this embodiment includes an HDMI terminal 3, a histogram measurement unit 2, a tone correction unit 4, a microcomputer 1, an image processing unit 5, and the liquid crystal panel (R) 6, liquid crystal panel (G) 7, and liquid crystal panel (B) 8.

The HDMI terminal 3 receives images of respective frames in the format of a video signal. Assume that the HDMI terminal 3 is connected to an external tuner, and a color difference video signal in the YCbCr format as an output video of the tuner is input to the HDMI terminal 3. The resolution of an image expressed by a video signal for one frame is defined by 1920 pixels in the horizontal direction, and 1080 pixels in the vertical direction, and a Y component that represents a luminance value, and Cb and Cr components that represent color differences are respectively expressed by 10-bit digital values.

The image processing apparatus according to this embodiment is configured to execute dynamic tone correction processing for an input video signal by software processing of the microcomputer 1 and the processing of the histogram measurement unit 2 and the tone correction unit 4 implemented as hardware circuits.

Therefore, a video signal input to the HDMI terminal 3 is supplied to the tone correction unit 4 and the histogram measurement unit 2 as an image for each frame, and is to be processed by respective hardware circuits. The processing result of the histogram measurement unit 2 is input to the microcomputer 1 and is to be processed by the microcomputer 1.

That is, the image processing apparatus according to this embodiment converts the tone characteristics of input images input for respective frames using a tone correction table, and sequentially outputs converted images as output images.

Figure 7:
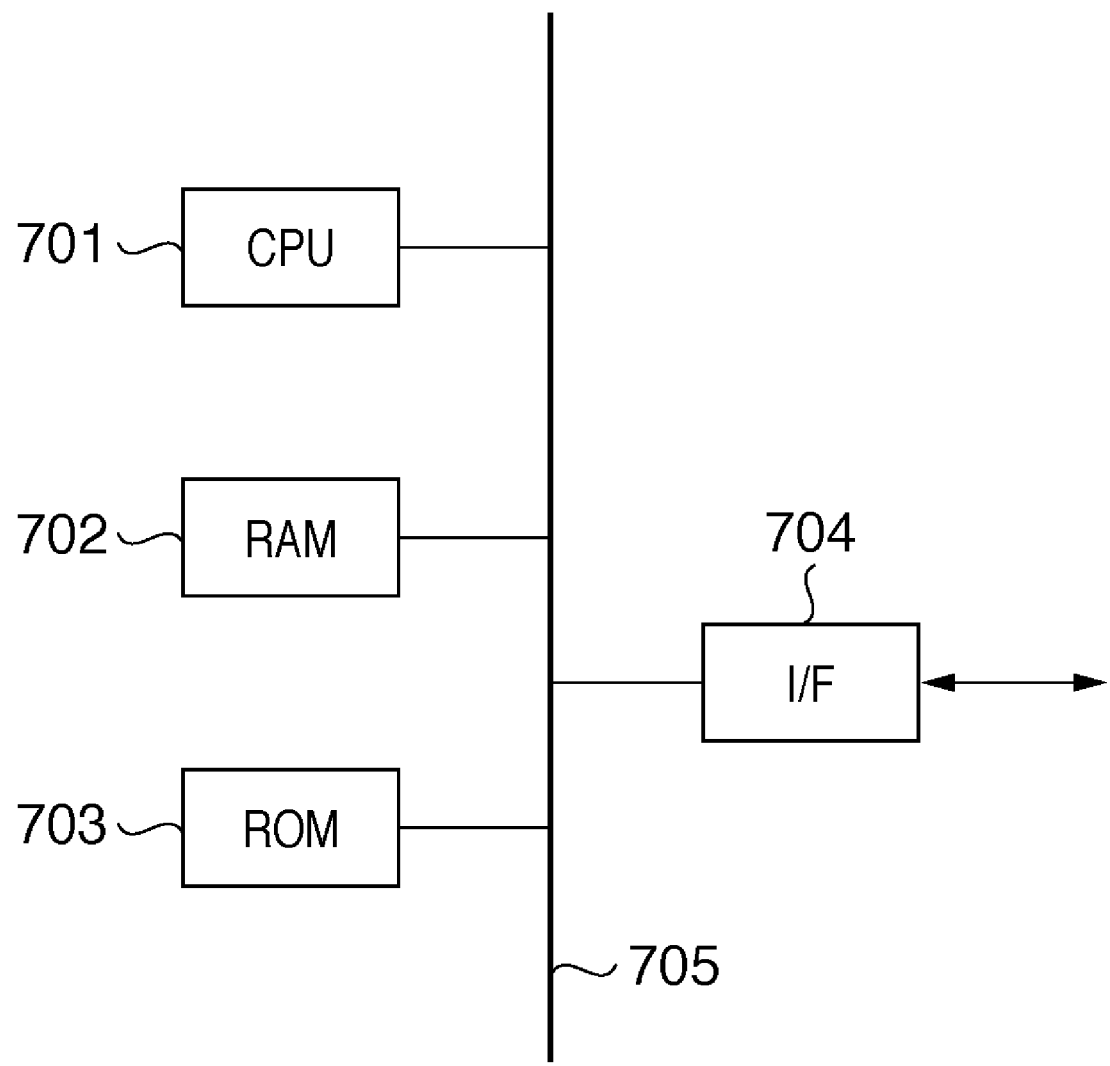
FIG. 7 is a block diagram showing an example of the hardware arrangement of the microcomputer 1.

FIG. 7 is a block diagram showing an example of the hardware arrangement of the microcomputer 1.

A CPU 701 controls the overall microcomputer 1 using programs and data stored in a RAM 702 and ROM 703, and executes respective processes to be described later as those implemented by the microcomputer 1.

The RAM 702 includes an area for temporarily storing externally input data via an I/F (interface) 704, data read out from the ROM 703 by the CPU 701, and the like. Furthermore, the RAM 702 includes a work area used when the CPU 701 executes various processes. That is, the RAM 702 can provide various areas as needed.

The ROM 703 stores programs and data for making the CPU 701 execute various processes to be described later as those implemented by the microcomputer 1. These programs and data are read out into the RAM 702 as needed under the control of the CPU 701.

The I/F 704 serves as an interface for connecting the microcomputer 1 to the histogram measurement unit 2 and the tone correction unit 4. Therefore, the microcomputer 1 exchanges data with the histogram measurement unit 2 and the tone correction unit 4 via the I/F 704.

Reference numeral 705 denotes a bus which interconnects the CPU 701, the RAM 702, the ROM 703, and the I/F 704.

Dynamic tone correction processing executed in the tone correction unit 4, the histogram measurement unit 2, and the microcomputer 1 will be described below.

The histogram measurement unit 2 receives an image for one frame (input image) from the HDMI terminal 3. The histogram measurement unit 2 generates histogram data of Y components of the input image every time it acquires the input image for one frame.

Histogram data generation processing by the histogram measurement unit 2 will be described in detail below.

When the range of luminance values (Y components) that can be expressed by the input image is divided into a plurality of levels (256 levels in this case), the histogram measurement unit 2 calculates totals of the numbers of pixels in the input image, each of which has a luminance value that belongs to an identical level. In this way, the histogram measurement unit 2 generates a histogram indicating the numbers of pixels for respective levels as histogram data.

The histogram measurement unit 2 stores the number of pixels which belong to level 0, the number of pixels which belong to level 1, . . . , and the number of pixels which belong to level 255 in its registers H(0) to H(255), respectively. Of course, a register H(x) stores the number of pixels which belong to level x.

Note that since the registers H(0) to H(255) are used for each frame, all the registers are reset to zero in advance when they are used for the next frame.

Values are written in the registers H(0) to H(255), for example, as follows. After all the registers H(0) to H(255) are reset to zero, the upper 8 bits of a Y component of each pixel which forms the input image are referred to, and the value of one of registers H(0) to H(255) is incremented by one according to that value. For example, if the upper 8 bits of a Y component represent zero (smallest luminance level), H(0) is incremented by one; if the upper 8 bits of a Y component represent 255 (largest luminance level), H(255) is incremented by 1.

In this way, the histogram measurement unit 2 can generate histogram data (those registered in the registers H(0) to H(255)) of Y components of an input image for one frame.

Figure 5:
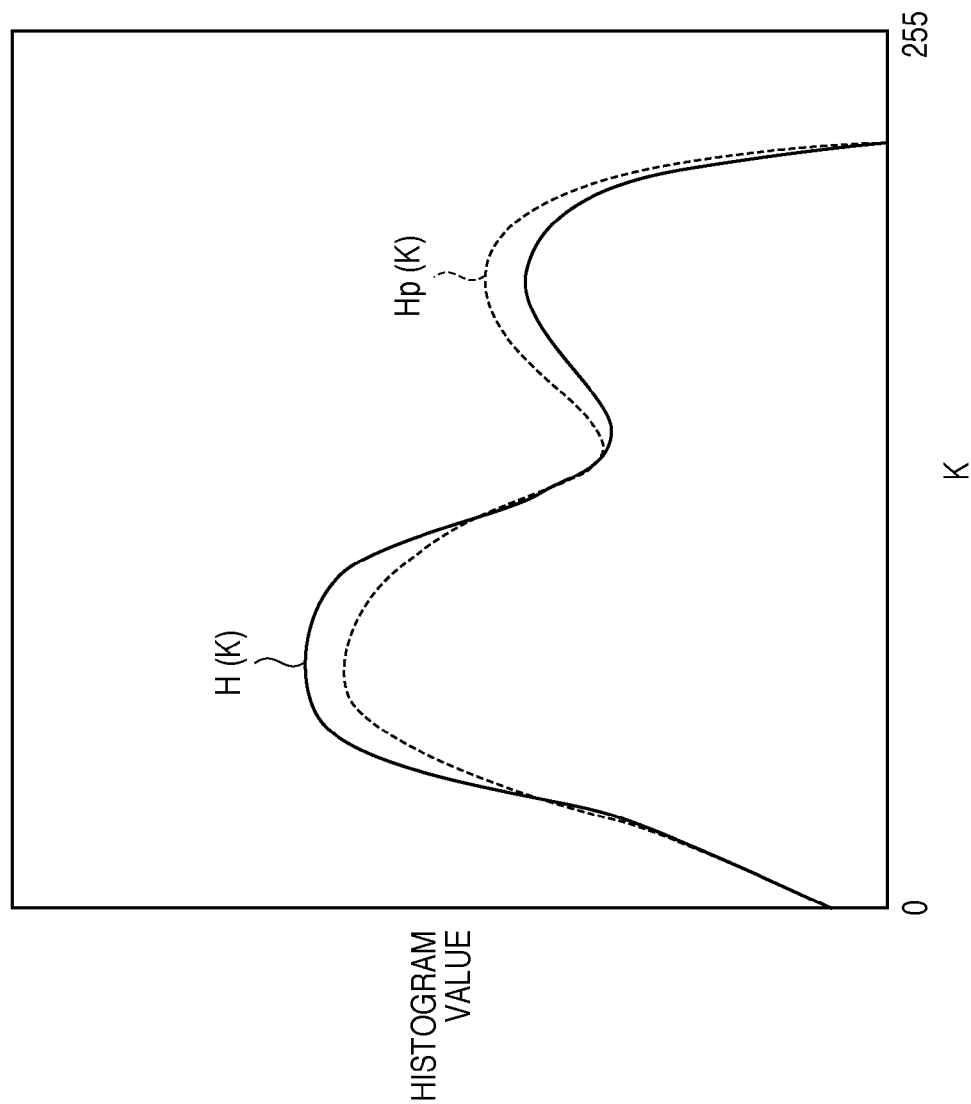
FIG. 5 is a graph showing an example of a histogram.

FIG. 5 shows an example of a histogram. The abscissa plots values K when the Y components of an input image are divided into 256 levels, and the ordinate plots the histogram values (the numbers of pixels) H(K). Assume that the solid curve indicates H(K) generated by actually calculating totals.

Upon completion of generation of histogram data of an input image for one frame, the histogram measurement unit 2 outputs an interrupt signal to the microcomputer 1.

Figure 2:
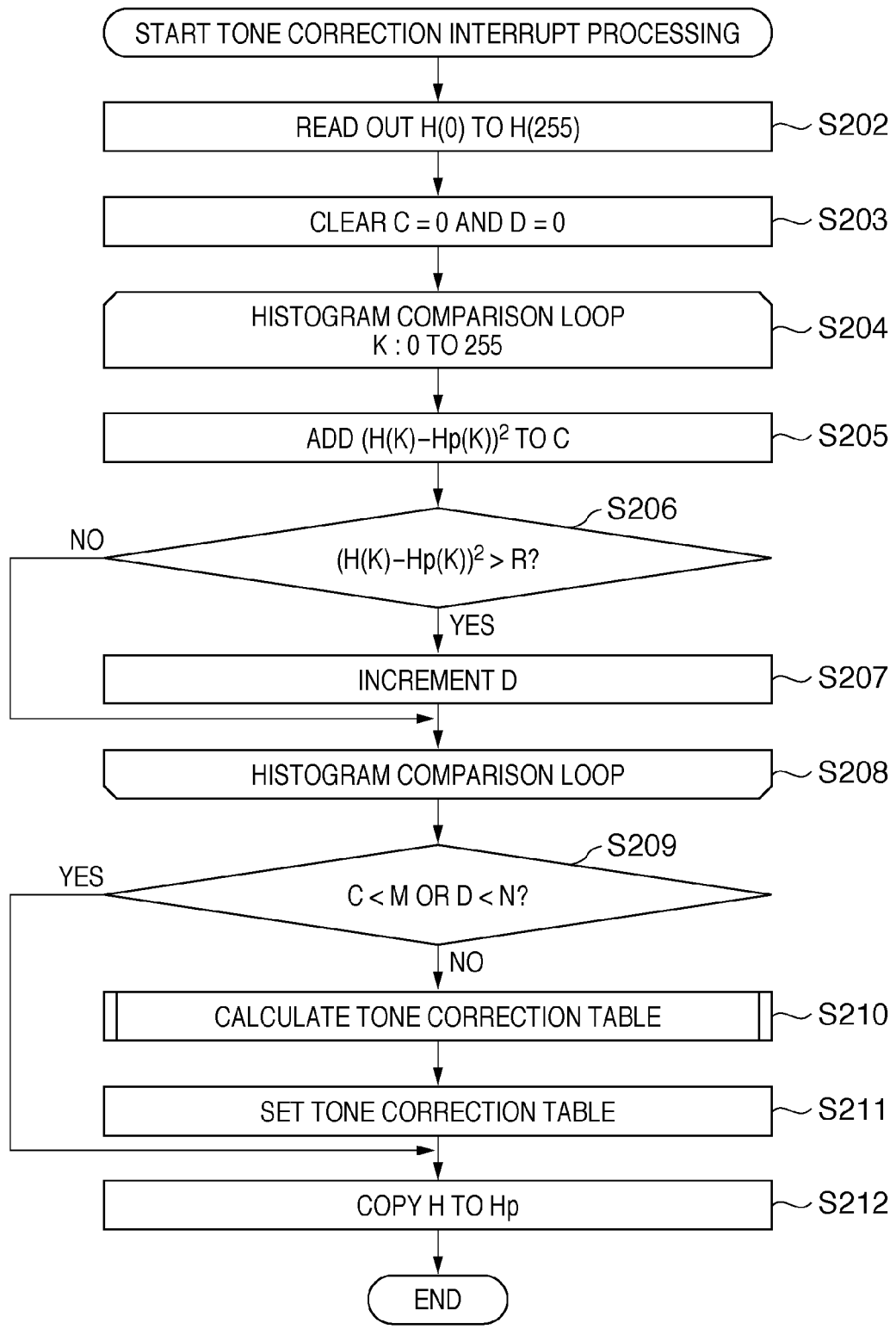
FIG. 2 is a flowchart of processing to be executed by a microcomputer 1.

Upon reception of the interrupt signal from the histogram measurement unit 2, the microcomputer 1 starts processing according to the flowchart shown in FIG. 2. Note that programs and data for making the CPU 701 of the microcomputer 1 execute the processing shown in FIG. 2 are stored in the ROM 703. The CPU 701 reads out these programs and data onto the RAM 702, and executes them.

In step S202, the CPU 701 reads out respective data in the registers H(0) to H(255) into the RAM 702 via the I/F 704.

In step S203, the CPU 701 clears variables C and D used in the subsequent processing to zero.

The CPU 701 loops the respective processes in steps S205 to S207 from K=0 to K=255 to have a variable K as a loop variable. That is, the CPU 701 executes the processes in steps S205 to S207 for each of K=1, K=2, . . . , K=254, and K=255.

In step S205, the CPU 701 calculates the degree of approximation between a histogram value H(K) read out in step S202 and a histogram value Hp(K) similarly generated by the microcomputer 1 in the immediately preceding frame. The histogram value Hp(K) of the previous frame is a value held in the RAM 702 by the microcomputer 1. Assuming that the dotted curve in FIG. 5 expresses Hp(K), differences are generated between the values H(K) and Hp(K) in accordance with the amount of motion between the frames, as shown in FIG. 5.

As a method of calculating the degree of approximation, a method of calculating the sum total of error components, each of which is calculated by squaring the difference between the two values is generally used. For this reason, in this embodiment, the difference between H(K) and Hp(K) is squared, and is added to a variable C, as given by:

$$C=C+(H(K)-Hp(K))^2$$

In this embodiment, the degree of approximation is calculated using the square of the difference between histogram values. For example, in order to simplify calculations, only the difference may be used without any square processing, thus obtaining the same effect.

The CPU 701 checks in step S206 if an error component, i.e., $(H(K)-Hp(K))^2$ is larger than a constant R. Note that the constant R is a threshold used to determine if a histogram variation amount between frames is large, and is determined in advance in consideration of the histogram variation amount between the frames, the influence of noise, and the like.

If it is determined in step S206 that the error component is larger than the constant R, the CPU 701 determines that the histogram variation amount at level K between the frames is large, and the process advances to step S207. On the other hand, if the error component is equal to or smaller than the constant R, the process jumps to step S208.

In step S207, the CPU 701 increments the value of the variable D by one.

In step S208, the CPU 701 increments the value of the variable K by one unless it is 255, and repeats the processes in step S205 and subsequent steps.

In this way, the CPU 701 can calculate the sum total of error components (=variable C) for all of K=0 to 255, and can count the number of error components larger than the constant R (=variable D). As for the processing for calculating the sum total of error components, the following processing is generally executed. That is, the CPU 701 calculates the difference between the numbers of pixels that belong to an identical level for each level using histogram data generated for an input image of the first frame, and that generated for an input image of the second frame. The CPU 701 then calculates the sum total of the differences calculated for respective levels as that of error components.

The CPU 701 checks in step S209 if the value of the variable C is smaller than a constant M or the value of the variable D is smaller than a constant N (if the number of levels with large histogram variable amounts between the frames is smaller than N). Note that the constant M is a threshold used to determine if the degree of approximation between the frames is high or low, and is determined in advance. The constant N is a threshold used to discriminate a case in which the number of levels with histogram variations is zero or small, e.g., a state in which a change in video is none or small or a state in which only a part in a video has changed, from a state in which many parts of a video have changed, and is determined in advance.

If C<M or D<N, the CPU 701 determines that a change in video is none or small or that only a part in a video has changed, and the degree of approximation between the frames is high, and the process jumps to step S212.

On the other hand, if C≧M and D≧N (both C and D are equal to or larger than the thresholds), the process advances to step S210.

In step S210, the CPU 701 calculates a new tone correction table so as to update a tone correction table held by the tone correction unit 4.

Note that the tone correction table is used to convert the tone characteristic of an image input to the image processing apparatus according to this embodiment. That is, the tone correction table is used to convert the tone characteristic to have an input pixel value (a value of an input video signal) as an argument, and its output value as the value of an output video signal. In this case, the argument is expressed by 256 levels, and the output value of the tone correction table is expressed by 10 bits, i.e., 1024 levels.

Figure 3:
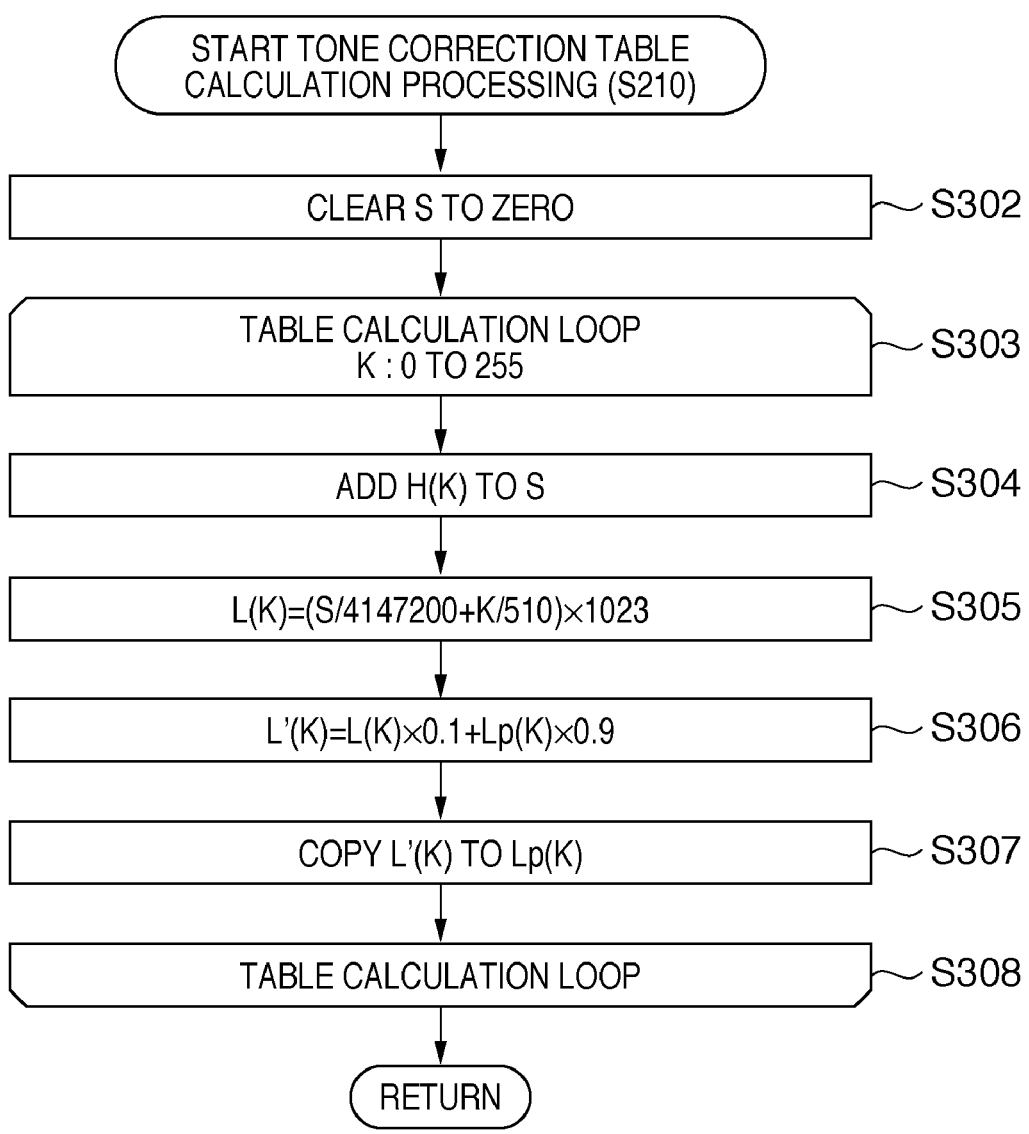
FIG. 3 is a flowchart showing details of calculation processing of a tone correction table in step S210.

FIG. 3 is a flowchart showing details of the tone correction table calculation processing in step S210.

In step S302, the CPU 701 clears a variable S used in the subsequent processes to zero.

The CPU 701 loops the processes in steps S304 to S307 from K=0 to K=255 to have the variable K as the loop variable. That is, the CPU 701 executes the processes in steps S304 to S307 for each of K=1, K=2, . . . , K=254, and K=255.

In step S304, the CPU 701 adds the value of H(K) to the value of the variable S. That is, at this time, the variable S holds an integration result of the values from H(0) to H(K).

In step S305, the CPU 701 calculates a tone correction table L(K) using the variables S and K. Processing for calculating the tone correction table L(K) will be described in detail below.

If L(K) is proportional to K, a tone correction table that does not change the tone correction characteristic is generated. On the other hand, since S is obtained by integrating histogram data, if L(K) is proportional to S, the histogram of a video signal to be output is smoothed. However, in practice, if the histogram is completely smoothed, an extreme video is generated. For this reason, L(K) is calculated by combining K and S at predetermined ratios. The combining ratios are determined in consideration of the degree of tone correction and the like. In this embodiment, assume that the ratios of K and S are respectively 0.5. Since the resolution is defined by 1920×1080 pixels, and the output value of the tone correction table is expressed by 10 bits, the tone correction table L(K) is calculated based on:

$$L(K)=\{S/(1920\times 1080)\times 0.5+K/255\times 0.5\}\times 1023 \quad (1)$$

Equation (1) above can be rewritten as:

$$L(K)=\{S/4147200+K/510\}\times 1023 \quad (2)$$

Therefore, the CPU 701 calculates the tone correction table L(K) corresponding to the current frame using equation (2) above.

However, if the tone correction table calculated for each frame is directly applied to a video, when the tone correction tables largely change for respective frames, the brightness of a part of the video may abruptly change or the video may appear to flicker, thus posing a problem. Therefore, in this embodiment, the tone correction table (temporary tone correction table) L(K) calculated in step S305 is not directly applied to a video.

More specifically, in step S306 the CPU 701 calculates a tone correction table L'(K) to be applied to the current frame by combining a previous tone correction table Lp(K) and the tone correction table L(K) calculated in step S305 at predetermined ratios. The CPU 701 calculates the tone correction table L'(K) based on:

$$L'(K)=L(K)\times 0.1+Lp(K)\times 0.9 \quad (3)$$

The percentage of the tone correction table L(K) calculated for the current frame, and that of the previous tone correction table Lp(K) that used to determine L'(K) are determined in consideration of the response time of the tone correction table with respect to a video and the like. In this embodiment, these ratios are respectively 0.1 and 0.9.

In step S307, the CPU 701 copies L'(K) to Lp(K) and saves it in the RAM 702, so as to use the current tone correction table L'(K) for the next frame.

In step S308, the CPU 701 increments the value of the variable K by one unless it is 255, and repeats the processes in step S304 and subsequent steps. On the other hand, if the value of the variable K reaches 255, the control returns to step S211 in FIG. 2.

Referring back to FIG. 2, in step S211 the CPU 701 sets the tone correction table L'(K) calculated in step S210 in the tone correction unit 4 as a tone correction table to be applied to an image of the current frame. That is, the CPU 701 updates the tone correction table held in the tone correction unit 4 so far to the tone correction table L'(K) calculated in step S210.

In step S212, the CPU 701 saves H(K) in the RAM 702 to overwrite them on Hp(K) for all "K"s, so as to use H(K) as the histogram values of the previous frame at the time of processing of the next frame, thus ending the processing. That is, upon processing of an image of the next frame, H(K) used in the above processes is used as Hp(K).

The tone correction unit 4 corrects the tone characteristic of an image received from the HDMI terminal 3 using the tone correction table held by itself, and outputs the corrected image as an output image to the subsequent image processing unit 5.

The image processing unit 5 applies various image adjustment processes such as contrast adjustment, brightness adjustment, color adjustment, edge emphasis, and noise reduction processing to the image received from the tone correction unit 4. These image quality adjustment values are adjusted by, e.g., a method by means of user's adjustment operations using a menu function on the screen of the projection display. Also, the image processing unit 5 applies gamma correction and the like for correcting the device characteristics of the liquid crystal panel (R) 6, the liquid crystal panel (G) 7, and the liquid crystal panel (B) 8 of the projection display.

The image processing unit 5 converts the image-adjusted video signal into analog signals to be supplied to the liquid crystal panel (R) 6, the liquid crystal panel (G) 7, and the liquid crystal panel (B) 8, respectively. At the same time, the image processing unit 5 generates signals for driving the respective liquid crystal panels, and supplies the video signals and driving signals to the respective liquid crystal panels. As a result, voltages according to the video signals are applied to respective pixels on the liquid crystal panels.

As described above, according to this embodiment, since the tone correction table is not updated when the change in video is zero or small, tone correction results for respective frames can be prevented from having a large difference, and a high-quality image can be presented.

That is, by detecting a specific scene of a video by a small-scale circuit or processing using the histogram, whether or not to apply dynamic tone correction processing can be appropriately determined depending on scenes, thus implementing dynamic tone correction processing with higher quality.

Second Embodiment

This embodiment is the same as the first embodiment, except only for the processing executed by the microcomputer 1. The processing executed by the microcomputer 1 in this embodiment will be described below.

Figure 4:
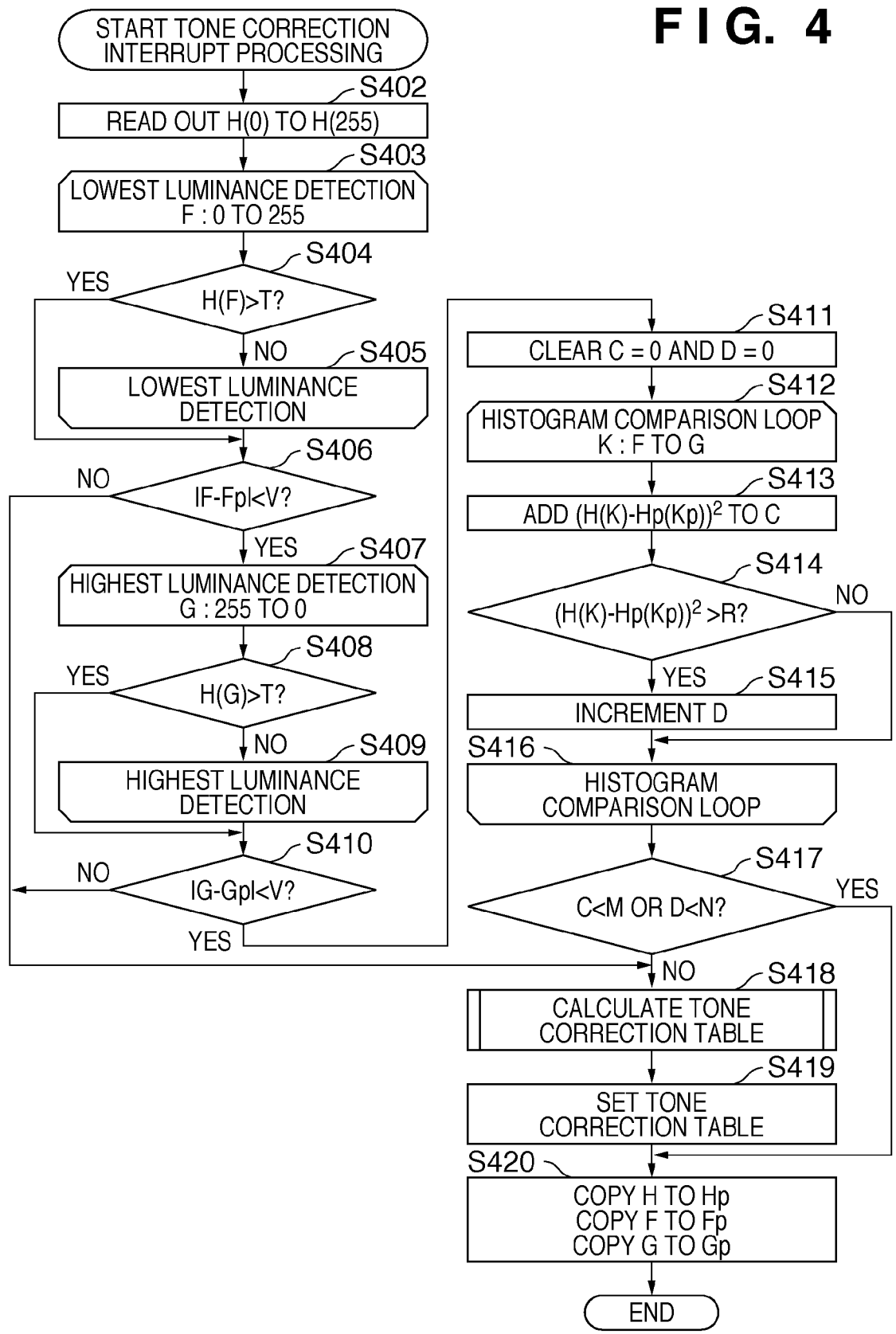
FIG. 4 is a flowchart of processing to be executed by the microcomputer 1.

Upon reception of an interrupt signal from the histogram measurement unit 2, the microcomputer 1 starts processing according to the flowchart shown in FIG. 4. Note that programs and data for making the CPU 701 of the microcomputer 1 execute the processing shown in FIG. 4 are stored in the ROM 703. The CPU 701 reads out these programs and data into the RAM 702, and executes them.

Figure 6:
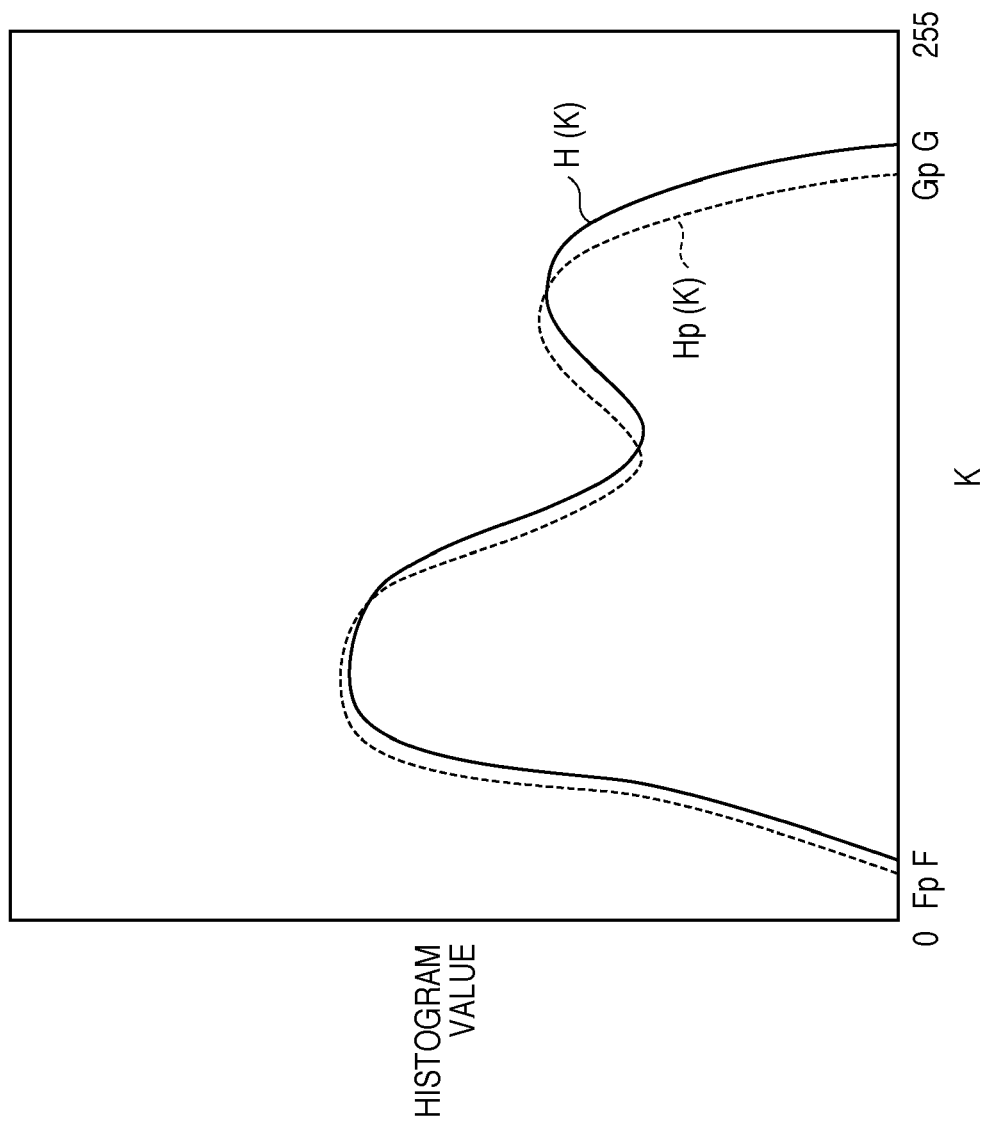
FIG. 6 is a graph showing an example of a histogram.

In step S402, the CPU 701 reads out respective data in the registers H(0) to H(255) into the RAM 702 via the I/F 704. FIG. 6 shows an example of histogram values. Assume that the solid curve represents H(K).

Next, the CPU 701 executes the process in step S404 respectively for F=1, . . . , F=254, and F=255 in turn from F=0. That is, the CPU 701 repeats a loop until H(F)>T by incrementing the value of a variable F starting with F=0. Therefore, the CPU 701 checks in step S404 if the value of H(F) is larger than a predetermined threshold T. Note that the threshold T is a constant which is set in advance to ignore a slight value such as noise.

If it is determined in step S404 that H(F)>T, the CPU 701 exits this loop, and the process jumps to step S406. Note that when F that satisfies H(F)>T, this indicates the position of the lowest luminance level of H(K) (a level to which the lowest luminance value belongs), as shown in FIG. 6.

The CPU 701 checks in step S406 if the absolute value of the difference between the value of the variable F at the time of exiting the loop and the value of a variable Fp indicating the lowest luminance level in the previous frame is smaller than V. Note that the value Fp is held in the RAM 702 by the microcomputer 1, and indicates the position of the lowest luminance level of the histogram values Hp(K) of the previous frame, as shown in FIG. 6. Also, V is a threshold used to determine if a change in lowest luminance level between the frames is large, and is a constant which is determined in advance.

If it is determined in step S406 that |F−Fp|<V, the CPU 701 determines a case in which the level change of a video is small, i.e., a video fades out from a normal display state to a white frame. If the change amount of the lowest luminance level is small, the process advances to step S407 and step S408. On the other hand, if |F−Fp|≧V, the CPU 701 determines that a change in video is large, and the process jumps to step S418. Note that the processes in steps S418 and S419 are the same as those in steps S210 and S211 described earlier, and a description of the processes in these steps will not be repeated.

On the other hand, the CPU 701 executes the process in step S408 for G=254, . . . , G=1, and G=0 in turn from G=255. That is, the CPU 701 repeats a loop until H(G)>T by decrementing the value of a variable G starting with G=255. Therefore, the CPU 701 checks in step S408 if the value of H(G) is larger than the predetermined threshold T.

If it is determined in step S408 that H(G)>T, the CPU 701 exits the loop, and the process jumps to step S410. Note that G which satisfies H(G)>T indicates the position of the highest luminance level of H(K) (a level to which the highest luminance value belongs), as shown in FIG. 6.

The CPU 701 checks in step S410 if the absolute value of the difference between the value of the variable G at the time of exiting the loop and the value of a variable Gp indicating the highest luminance level in the previous frame is smaller than V. Note that the value Gp is held in the RAM 702 by the microcomputer 1, and indicates the position of the highest luminance level of the histogram values Hp(K) of the previous frame, as shown in FIG. 6.

If it is determined in step S410 that |G−Gp|<V, the CPU 701 determines a case in which the level change of a video is small, i.e., a video fades in from a black-level display state to a normal display state while increasing the luminance level. If the change amount of the highest luminance level is small, the process advances to step S411. On the other hand, if |G−G|≧V, the CPU 701 determines that the change in video is large, and the process advances to step S418.

In step S411, the CPU 701 clears variables C and D used in the subsequent processes to zero.

The CPU 701 loops the processes in steps S413 to S415 from K=F to K=G to have the variable K as a loop variable. More specifically, the CPU 701 executes the processes in steps S413 to S415 for each of K=F, K=F+1, . . . , K=G−1, and K=G.

In step S413, the CPU 701 calculates the degree of approximation between a histogram value H(K) read out in step S402 and a histogram value Hp(Kp) similarly generated by the microcomputer 1 in the immediately preceding frame. Letting Kp be the histogram level of the previous frame corresponding to the histogram level K of the current frame, Kp is expressed, in consideration of F, G, and the lowest luminance level Fp and the highest luminance level Gp of the previous frame, by:

$$Kp=Fp+(K-F)(Gp-Fp)/(G-F) \qquad (4)$$

Therefore, in step S413 the CPU 701 calculates Kp using equation (4) above. After that, the CPU 701 calculates the square of the difference between H(K) and Hp(Kp) (the difference between the corresponding levels), and adds it to the variable C, as given by:

$$C=C+(H(K)-Hp(Kp)))^2 \qquad (5)$$

In this embodiment, the degree of approximation is calculated using the square of the difference between histogram values. For example, in order to simplify calculations, only the difference may be used without any square processing, thus obtaining the same effect.

The CPU 701 checks in step S414 if an error component, i.e., $(H(K)-Hp(Kp))^2$ is larger than a constant R. Note that the constant R is a threshold used to determine if a histogram variation amount between the frames is large, and is determined in advance in consideration of the histogram variation amount between the frames, the influence of noise, and the like.

If it is determined in step S414 that the error component is larger than the constant R, the CPU 701 determines that the histogram variation amount at level K between the frames is large, and the process advances to step S415. On the other hand, if the error component is equal to or smaller than the constant R, the process jumps to step S416.

In step S415, the CPU 701 increments the value of the variable D by one.

In step S416, the CPU 701 increments the value of the variable K by one unless it is G, and repeats the processes in step S412 and subsequent steps.

In this way, the CPU 701 can calculate the sum total of error components (=variable C) for all of K=F to G, and can count the number of error components larger than the constant R (=variable D).

The CPU 701 checks in step S417 if the value of the variable C is smaller than a constant M or the value of the variable D is smaller than a constant N (if the number of levels with the large histogram variable amounts between the frames is smaller than N). Note that the constant M is a threshold used to determine if the degree of approximation between the frames is high or low, and is determined in advance. The constant N is a threshold used to discriminate a case in which the number of levels with histogram variations is zero or small, e.g., a state in which the change in video is zero or small or a state in which only a part in a video has changed, from a state in which many parts of a video have changed, and is determined in advance.

If C<M or D<N, the CPU 701 determines that the change in video is zero or small or that only a part in a video has changed, and the degree of approximation between the frames is high, and the process jumps to step S420.

On the other hand, if C≧M and D≧N, the process advances to step S418.

Since the processes in steps S418 and S419 are the same as those in steps S210 and S211, as described above, a description thereof will not be repeated.

In step S420, the CPU 701 saves H(K), F, and G in the RAM 702 to overwrite them on Hp(K), Fp, and Gp, so as to use H(K), F, and G as information of the histogram of the previous frame at the time of processing the next frame, thus ending the processing.

In the above embodiments, whether or not to correct the tone correction table is checked for each frame. Alternatively, this checking processing may be executed for every N (≧2) frames.

Other Embodiments

The objects of the present invention can be achieved as follows. That is, a recording medium (or storage medium) that records program codes (computer programs) of software required to implement the functions of the aforementioned embodiments is supplied to a system or apparatus. That storage medium is a computer-readable storage medium, needless to say. A computer (or a CPU or MPU) of that system or apparatus reads out and executes the program codes stored in the recording medium. In this case, the program codes themselves read out from the recording medium and implement the functions of the aforementioned embodiments, and the recording medium that records the program codes constitutes the present invention.

When the computer executes the readout program codes, an operating system (OS) or the like, which runs on the computer, executes some or all of actual processes based on instructions of these program codes. The present invention also includes a case in which the functions of the aforementioned embodiments are implemented by these processes.

Furthermore, assume that the program codes read out from the recording medium are written in a memory equipped on a function expansion card or a function expansion unit which is inserted in or connected to the computer. After that, a CPU or the like equipped on the function expansion card or unit executes some or all of actual processes based on instructions of these program codes, thereby implementing the functions of the aforementioned embodiments.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-098745 filed Apr. 4, 2008, which is hereby incorporated by reference herein in its entirety.

What is claimed is:

1. An image processing apparatus, which converts tone characteristics of input images input for respective frames using a tone correction table, and sequentially outputs the converted images as output images, comprising:

a holding unit which holds the tone correction table;

a generation unit which generates, when a range of luminance values expressed by the input image is divided into a plurality of levels, histogram data indicating the numbers of pixels for respective levels of the plurality of levels by calculating, for the respective levels, the total of the number of pixels in the input image, which have luminance values that belong to an identical level;

a calculation unit which calculates, for the respective levels of the plurality of levels the difference between the number of pixels that belong to an identical level using histogram data generated by said generation unit for an input image of a first frame and histogram data generated by said generation unit for an input image of a second frame which was input immediately before the input image of the first frame;

a determination unit which determines, based on the differences for the respective levels calculated by said calculation unit, whether or not to update the tone correction table held by said holding unit;

an updating unit which updates, when said determination unit determines to update the tone correction table, the tone correction table held by said holding unit; and a unit which outputs a result obtained by converting a tone characteristic of the input image of the first frame using the tone correction table held by said holding unit as an output image of the first frame.

2. The apparatus according to claim 1, wherein said calculation unit comprises:

a unit which calculates a sum total of the differences for the respective levels; and a unit which counts the number of differences which are calculated for the respective levels and are larger than a difference threshold, and wherein when the sum total is smaller than a sum total threshold or the number of the differences is smaller than the difference threshold, said determination unit determines not to update the tone correction table held by said holding unit, and when the sum total is not less than the sum total threshold and the number of the differences is not less than the difference threshold, said determination unit determines to update the tone correction table held by said holding unit.

3. The apparatus according to claim 1, wherein said calculation unit comprises:

a unit which specifies a level to which the highest luminance value belongs and a level to which the lowest luminance value belongs using the histogram data generated by said generation unit for the input image of the first frame;

a unit which calculates the differences between the respective levels from the level to which the highest luminance value belongs to the level to which the lowest luminance value belongs in the histogram data generated by said generation unit for the input image of the first frame, and corresponding respective levels in the histogram data generated by said generation unit for the input image of the second frame;

a unit which calculates a sum total of the calculated differences for the respective levels; and a unit which counts the number of differences which are calculated for respective levels and are larger than a difference threshold, and wherein when the sum total is smaller than a sum total threshold or the number of differences is smaller than the difference threshold, said determination unit determines not to update the tone correction table held by said holding unit, and when the sum total is not less than the sum total threshold and the number of differences is not less than the difference threshold, said determination unit determines to update the tone correction table held by said holding unit.

4. The apparatus according to claim 1, wherein said updating unit generates a temporary tone correction table which holds values calculated for the respective levels by executing processing for calculating a value calculated based on an equation which is proportional to a number indicating a level of the plurality of levels and the number of pixels at that level as a value for that level, and wherein said updating unit updates the tone correction table held by said holding unit according to a result obtained by combining a tone correction table applied to an image of the second frame and the temporary tone correction table at predetermined ratios.

5. The apparatus according to claim 2, wherein when the difference calculated by said calculation unit between a level of the plurality of levels to which the highest luminance value belongs in the histogram data generated by said generation unit for the input image of the first frame and a level of the plurality of levels to which the highest luminance value belongs in the histogram data generated by said generation unit for the input image of the second frame is not less than a threshold associated therewith, said determination unit determines to update the tone correction table held by said holding unit.

6. The apparatus according to claim 4, wherein when the difference calculated by said calculation unit between a level of the plurality of levels to which the lowest luminance value belongs in the histogram data generated by said generation unit for the input image of the first frame and a level of the plurality of levels to which the lowest luminance value belongs in the histogram data generated by said generation unit for the input image of the second frame is not less than a threshold associated therewith, said determination unit determines to update the tone correction table held by said holding unit.

7. An image processing method to be executed by an image processing apparatus, which comprises a holding unit which holds a tone correction table, converts tone characteristics of input images input for respective frames using the tone correction table, and sequentially outputs the converted images as output images, the method comprising:
   a generation step of generating, when a range of luminance values expressed by the input image is divided into a plurality of levels, histogram data indicating the numbers of pixels for respective levels of the plurality of levels by calculating, for the respective levels, the total of the number of pixels in the input image, which have luminance values that belong to an identical level;
   a calculation step of calculating, for the respective levels of the plurality of levels, the difference between the number of pixels that belong to an identical level using histogram data generated in the generation step for an input image of a first frame and histogram data generated in the generation step for an input image of a second frame which was input immediately before the input image of the first frame;
   a determination step of determining, based on the differences for the respective levels calculated in the calculation step, whether or not to update the tone correction table held by the holding unit;
   an updating step of updating, when it is determined in the determination step to update the tone correction table, the tone correction table held by the holding unit; and
   a step of outputting a result obtained by converting a tone characteristic of the input image of the first frame using the tone correction table held by the holding unit as an output image of the first frame.

8. A non-transitory computer-readable storage medium storing a computer program for making a computer function as respective units of an image processing apparatus, which converts tone characteristics of input images input for respective frames using a tone correction table, and sequentially outputs the converted images as output images, the image processing apparatus comprising:
   a holding unit which holds the tone correction table;
   a generation unit which generates, when a range of luminance values expressed by the input image is divided into a plurality of levels, histogram data indicating the numbers of pixels for respective levels of the plurality of levels by calculating, for the respective levels, the total of the number of pixels in the input image, which have luminance values that belong to an identical level;
   a calculation unit which calculates, for the respective levels of the plurality of levels the difference between the number of pixels that belong to an identical level using histogram data generated by said generation unit for an input image of a first frame and histogram data generated by said generation unit for an input image of a second frame which was input immediately before the input image of the first frame;
   a determination unit which determines, based on the differences for the respective levels calculated by said calculation unit, whether or not to update the tone correction table held by said holding unit;
   an updating unit which updates, when said determination unit determines to update the tone correction table, the tone correction table held by said holding unit; and
   a unit which outputs a result obtained by converting a tone characteristic of the input image of the first frame using the tone correction table held by said holding unit as an output image of the first frame.

* * * * *